United States Patent [19]

Murakawa et al.

[11] Patent Number: 4,937,215

[45] Date of Patent: Jun. 26, 1990

[54] PROCESS FOR RESTORING DEACTIVATED CATALYSTS

[75] Inventors: Takashi Murakawa; Tomoaki Hirano, both of Sodegaura, Japan

[73] Assignee: Research Association for Utilization of Light Oil, Tokyo, Japan

[21] Appl. No.: 256,697

[22] Filed: Oct. 12, 1988

[30] Foreign Application Priority Data

Nov. 13, 1987 [JP] Japan ............................ 62-285230

[51] Int. Cl.$^5$ .................... B01J 29/38; B01J 38/46; B01J 38/44; C10G 35/095
[52] U.S. Cl. .................................. 502/36; 208/140; 502/37; 502/517
[58] Field of Search ................... 502/36, 37, 517; 208/140

[56] References Cited

U.S. PATENT DOCUMENTS

| | | | |
|---|---|---|---|
| 3,904,510 | 9/1975 | Sinfelt et al. | 502/37 |
| 3,998,755 | 12/1976 | Hayes | 502/37 |
| 4,046,673 | 9/1977 | Paynter et al. | 502/37 |
| 4,438,288 | 3/1984 | Imai et al. | 502/36 |
| 4,810,683 | 3/1989 | Cohn et al. | 502/37 |

Primary Examiner—Paul E. Konopka
Attorney, Agent, or Firm—Frishauf, Holtz, Goodman & Woodward

[57] ABSTRACT

A process for restoring deactivated catalysts containing zeolite with a noble metal of Group VIII of the Periodic Table and to be used in the production of aromatic compounds, wherein decoking of the deactivated catalysts is carried out in the presence of halogen or a halogen-containing compound. This restoration process permits effective restoration of deactivated catalysts and thus is expected to be employed in the fields of petroleum purification, petrochemistry and so forth.

14 Claims, No Drawings

PROCESS FOR RESTORING DEACTIVATED CATALYSTS

BACKGROUND OF THE INVENTION

1. Field of the Invention

The present invention relates to a process for restoring deactivated catalysts and more particularly a process for efficiently restoring deactivated catalysts for the production of aromatic compounds, containing zeolite and a noble metal or metals of Group VIII of the Periodic Table supported thereon.

2. Description of the Related Art

Various catalysts such as zeolite with a noble metal (e.g., platinum) supported thereon have been known to be effective in the production of aromatic compounds. These catalysts need restoration treatment at suitable intervals because they are deactivated by accumulation of coke on the noble metal after a long term reaction and no longer act as catalysts.

It is well known that coke on a deactivated catalyst (e.g., platinum-supported L-type zeolite) can be removed (decoked) by heating it to temperatures between 430° C. and 540° C. in the presence of diluted oxygen. This decoking at high temperatures causes the agglomeration of the supported noble metal particles, that is, a decrease in the surface area of the noble metal particles, which will lead to a decrease of catalytic activity. Therefore, it is necessary after the high temperature decoking that the catalyst is brought in contact with air and chlorine or a chlorine compound such as carbon tetrachloride at an elevated temperature (oxychlorination treatment) to redisperse the noble metal particles (see Japanese patent application Laid-Open Nos. 168540/1985 and 55045/1983).

By the above oxychlorination treatment, however, it is quite difficult to restore catalysts poisoned with sulfur or those extremely deactivated.

SUMMARY OF THE INVENTION

The present invention is intended to overcome the above problems and its object is to provide a process for restoring deactivated catalysts whereby carbonaceous residual materials can be removed from the deactivated catalyst without causing the agglomeration of supported noble metal particles at the time of decoking, and even in the case of catalysts deactivated by sulfur poisoning or catalysts extremetly deactivated, their activities can be restored to a level nearly equal to that of fresh catalysts.

It has now been found that this object can be attained by decoking deactivated catalysts in the presence of halogen or halogen-containing compounds.

The present invention relates to a process for restoring deactivated catalysts for the production of aromatic compounds, said catalyst containing zeolite with a noble metal of Group VIII of the Periodic Table supported thereon, which process comprises decoking the deactivated catalyst in the presence of halogen or a halogen-containing compound.

DESCRIPTION OF PREFERRED EMBODIMENTS

Catalysts to which the restoration process of the present invention can be applied are deactivated catalysts for the production of aromatic compounds, said catalysts containing zeolite with a noble metal or metals of Group VIII of the Periodic Table supported thereon. The zeolite may be synthetic zeolite or natural zeolite, and may be any of X-type, Y-type, L-type, Mordenitetype, ZSM-5-type, and so forth. Zeolite of the L-type is particularly preferred. The metals to be supported are selected from the noble metals of Group VIII of the Periodic Table, e.g., Os, Ru, Rh, Ir, Pd and Pt. Of these, Pt is particularly preferred. The catalysts may contain Fe, Co, Ni and the like as the second component.

More specifically, the restoration process fo the present invention can be widely applied to, for example, the catalysts disclosed in Japanese patent application Laid-Open Nos. 33632/1977, 24316/1982, 133835/1983, 134035/1983, 223614/1983, 80333/1984, 179589/1984, 15489/1985, 168539/1985, 175548/1985, 60787/1986, 125437/1986, 148296/1986, 151019/1986, and 57653/1987.

The above catalysts are used in the production of aromatic compounds and are effective, for example, in the production of benzene from light naphtha, alkylbenzene from heavy naphtha, or high octane gasoline from heavy naphtha. When the catalysts are used in reactions as described above for a long time, they are deactivated by the accumulation of coke on the surface thereof.

In accordance with the present invention, the deactivated catalyst is restored by decoking in the presence of halogen or halogen-containing compounds.

As the halogen; fluorine gas, chlorine gas, bromine gas and an iodine element can be used. As the halogen-containing compounds; hydrogen halide, halogenated hydrocarbons and the like can be used. More specifically, HCl, $CH_3Cl$, $CH_2Cl_2$, $CHCl_3$, $CCl_4$, $C_2H_4Cl_2$, $C_2H_4Cl_4$, $C_2Cl_6$, $CF_4$, $CF_3Cl$, $CF_2Cl_2$, $CFCl_3$, $CHFCl_2$, $CHF_2Cl$, $CHF_3$, $C_2F_2Cl_4$, $C_2F_4Cl_2$, $C_2H_4F_2$, etc. can be used. Of these compounds, $CCl_4$, $CFCl_3$ and $C_2F_2Cl_4$ are preferred. The halogen or halogen-containing compound can be changed in its type during the decoking treatment.

The halogen or halogen-containing compound is used in a mixture with air or a mixed gas of oxygen and nitrogen. The cocentration of the halogen or halogen-containing compound is usually 0.01 to 10% and preferably 0.01 to 5%. If the concentration of the halogen or halogen-containing compound is too low, the restoration is only partially achieved. On the other hand, if the concentration is too high, various problems may arise.

Decoking conditions can be determined appropriately. In general, the decoking treatment is carried out at a temperature of 200° to 525° C. under a pressure of 0 to 20 kg/cm$^2$G.

In accordance with the restoration process of the present invention, the deactivated catalyst is usually restored to a level nearly equal to a fresh catalyst. In the case of catalysts markedly deactivated by the accumulation of coke or by sulfur poisoning, they are sometimes unable to be restored. In this case, it is preferred that the deactivated catalyst be subjected to a pretreatment using halogen or a halogen-containing compound.

In this pretreatment, the deactivated catalyst is brought in contact with halogen, a halogen-containing compound, or a mixture of either halogen or a halogen-containing compound and an inert gas.

As the halogen or halogen-containing compound; the same halogens or halogen-containing compounds usable in the above mentioned decoking treatment, can be used. The halogen or halogen-containing compound to be used in the pretreatment may be the same as or different from that usable in the decoking treatment. When the halogen or halogen-containing compound is used in a mixture with an inert gas, the concentration of the halogen or halogen-containing compound is at least 0.01% and preferably 0.1 to 20%. If the concentration is too low, the desired effects cannot be obtained.

Pretreatment conditions are determined appropriately depending on the type of the deactivated catalyst, the degree of deactivation, and so forth. Usually the pretreatment is carried out at a temperature of 100° to 500° C., preferably 100° to 400° C. under a pressure of 0 to 20 kg/cm$^2$G.

In accordance with the restoration process of the present invention, the activity of a deactivated catalyst can be restored to a level nearly equal to that of a fresh catalyst without causing the agglomeration of noble metal particles at the time of decoking and thus without applying a treatment for redispersion of noble metal particles. Furthermore, even in the case of catalysts extremely deactivated by coking or deactivated by sulfur poisoning, they can be efficiently restored by the process of the present invention.

Accordingly the restoration process of the present invention is expected to be used in the fields of petroleum purification, petrochemistry and so forth.

The present invention is described in greater detail with reference to the following examples.

EXAMPLE 1

(a) Preparation of Catalyst

KL-type zeolite molded using a silica binder (potassium-containing L-type zeolite, $SiO_2/KL = 20/100$ by weight) was subjected to chlorofluoro hydrocarbon (flon) treatment according to the method described in Japanese patent application Laid-Open No. 57653/1987 and, thereafter, platinum was supported thereon. The catalyst thus obtained is hereinafter referred to as Catalyst A.

(b) Deactivation of Catalyst

Catalyst A was deactivated by carrying out an aromatization reaction in the presence of Catalyst A using a light naphtha feed having the composition of n-hexane/isohexane/methylcyclopentane = 49/43/8 (by weight) and under conditions of temperature 500° C., pressure 5 kg/cm$^2$G, weight hourly space velocity 2 hr$^{-1}$ and hydrogen/hydrocarbon ratio (by volume) = 5/1. This deactivated catalyst is hereinafter referred to as Catalyst A1.

In carrying out the above aromatization reaction, the fresh catalyst and the deactivated catalyst were measured for a coke accumulation ratio, and the benzene conversion was calculated from the composition of the reaction product measured. The results are shown in Table 1.

(c) Restoration of Deactivated Catalyst 3 g of the catalyst A1 was placed in a reactor and treated for one hour at 300° C., 400° C. or 500° C. while passing a mixed gas of $CCl_4/O_2/N_2 = 0.05/2.00/97.95$ (by volume) at a rate of 100 cc/min. The catalyst thus restored is hereinafter referred to as Catalyst A2.

(d) Evaluation of Restored Catalyst 0.5 g of Catalyst A2 was placed in a quartz reactor, and the same light naphtha aromatization reaction as in (b) above was carried out under the same conditions as in (b). The coke accumulation ratio of the catalyst, composition of the reaction product, and conversion were measured. The results are shown in Table 1.

COMPARATIVE EXAMPLE 1

Catalyst A1 obtained in (b) of Example 1 was restored in the same manner as in (c) of Example 1 except that a mixed gas not containing $CCl_4$ ($O_2/N_2 = 2/98$ (by volume)) was used. The catalyst thus restored was evaluated in the same manner as in Example 1. The results are shown in Table 1.

TABLE 1

|  | Coke (%) | Conversion (wt %) | $C_1$–$C_4$ (wt %) | $C_5$ (wt %) | Benzene (wt %) |
|---|---|---|---|---|---|
| Catalyst A (Fresh Catalyst) | less than 0.1 | 94.7 | 7.0 | 5.5 | 82.2 |
| Catalyst A1 (Deactivated Catalyst) | 0.3 | 56.2 | 3.1 | 3.5 | 49.6 |
| Catalyst A2 (Example 1) | less than 0.1 | 89.1 | 4.7 | 4.6 | 79.8 |
| Catalyst A3 (Comparative Example 1) | less than 0.1 | 69.1 | 4.1 | 4.6 | 60.4 |

It can be seen from the results of Table 1 that Catalyst A2 restored by the present invention restored its activity to the level nearly equal to that of the fresh catalyst, and that in Catalyst A3 subjected to decoking in the absence of a halogen compound, although the coke accumulation ratio was equal to that of the fresh catalyst, the catalytic activity was markedly reduced.

EXAMPLE 2

3 g of the catalyst A1 was placed in a reactor and, while passing a mixed gas of $(CFCl_2)_2/O_2/N_2 = 2.0/9.8/88.2$ (by volume) through the reactor at a rate of 50 cc/min, it was treated at 270° C. for 30 minutes and further at 350° C. for 40 minutes and, thereafter, heated to and maintained at 500° C. for 15 minutes. The catalyst thus restored is hereinafter referred to as Catalyst A4.

0.5 g of the catalyst A4 was placed in a quartz reactor, and the same light naphtha aromatization reaction as in (b) of Example 1 was carried out under the same conditions as in (b) of Example 1. The coke accumulation ratio of the catalyst, composition of the reaction product, and conversion were measured. The results are shown in Table 2.

COMPARATIVE EXAMPLE 2

Catalyst A1 was subjected to decoking in the same manner as in Example 2 except that a mixed gas not containing $CFCl_2$ (i.e. $O_2/N_2 = 10/90$ by volume) was used. The catalyst thus restored is hereinafter referred to as Catalyst A5. Catalyst A5 was evaluated in the same manner as in Example 1. The results are shown in Table 2.

TABLE 2

|  | Coke (%) | Conversion (wt %) | $C_1$–$C_4$ (wt %) | $C_5$ (wt %) | Benzene (wt %) |
|---|---|---|---|---|---|
| Catalyst A (Fresh Catalyst) | less than 0.1 | 94.7 | 7.0 | 5.5 | 82.2 |
| Catalyst A1 (Deactivated Catalyst) | 0.3 | 56.2 | 3.1 | 3.5 | 49.6 |
| Catalyst A4 (Example 2) | less than 0.1 | 91.8 | 4.4 | 4.9 | 82.5 |

TABLE 2-continued

|  | Coke (%) | Conversion (wt %) | $C_1$-$C_4$ (wt %) | $C_5$ (wt %) | Benzene (wt %) |
|---|---|---|---|---|---|
| Catalyst A5 (Comparative Example 2) | less than 0.1 | 45.0 | 3.5 | 4.0 | 37.5 |

It can be seen from the results of Table 2 that in the process of the present invention, a fluorine-containing halogenated hydrocarbon can also be used as the halogen-containing compound, and that as compared with a chlorine-containing compound, the fluorine-containing compound increases the activity to a greater degree.

EXAMPLE 3

(a) Deactivation of Catalyst

To the same light naphtha as used in Example 1 was added a sulfur material to prepare a feed having a sulfur content of 1 ppm. Using the feed as prepared above, the aromatization reaction was carried out in the presence of Catalyst A under conditions of temperature 500° C., pressure 5 kg/cm$^2$, weight hourly space velocity 2 hr$^{-1}$, and hydrogen/hydrocarbon ratio (by volume) 5/1 to deactivate Catalyst A. This deactivated catalyst is hereinafter referred to as Catalyst B.

(b) Restoration of Deactivated Catalyst 3 g of the catalyst B was placed in a reactor and subjected to pretreatment under a flow of a mixed gas of CCl$_4$/N$_2$=3/87 (by volume) at a rate of 50 cc/min at 160° C. for 2 hours. Then the mixed gas to be passed through the reactor was replaced by a mixed gas of CCl$_4$/O$_2$/N$_2$=0.05/2.00/97.95 and restoration treatment was carried out under the same conditions as in Example 1. The catalyst thus restored is hereinafter referred to as Catalyst B1.

In this experiment, without application of pretreatment, restoration treatment was carried out under the same conditions as in Example 1. The catalyst thus obtained is hereinafter referred to as Catalyst B2.

(c) Evaluation of Catalyst

The same reaction as in Example 1 was carried out using Catalyst B, Catalyst B1 and Catalyst B2. The results are shown in Table 3.

COMPARATIVE EXAMPLE 3

The catalyst was subjected to decoking in the same manner as in (c) of Example 1 except that a mixed gas not containing CCl$_4$ (O$_2$/N$_2$=2/98 by volume) was used. The catalyst thus restored is hereinafter referred to as Catalyst B3. Catalyst B3 was evaluated in the same manner as in Example 1. The results are shown in Table 3.

COMPARATIVE EXAMPLE 4

Catalyst B3 obtained in Comparative Example 3 was subjected to oxychlorination treatment by passing a mixed gas of HCl/H$_2$O/O$_2$/N$_2$=0.2/2.0/9.8/88.0 (by volume) at 500° C. for 3 hours at a rate of 100 cc/min. The catalyst thus obtained is hereinafter referred to as Catalyst B31. Catalyst B31 was evaluated in the same manner as in Example 1. The results are shown in Table 3.

TABLE 3

|  | Coke (%) | Conversion (wt %) | $C_1$-$C_4$ (wt %) | $C_5$ (wt %) | Benzene (wt %) |
|---|---|---|---|---|---|
| Catalyst A (Fresh Catalyst) | less than 0.1 | 94.7 | 7.0 | 5.5 | 82.2 |
| Catalyst B (Deactivated Catalyst) | 0.2 | 1.2 | 0.2 | 0.2 | 0.8 |
| Catalyst B1 (Example 3) | less than 0.1 | 87.1 | 4.6 | 4.5 | 78.0 |
| Catalyst B2 (Example 3) | less than 0.1 | 70.0 | 5.0 | 5.0 | 60.0 |
| Catalyst B3 (Comparative Example 3) | less than 0.1 | 13.3 | 1.3 | 1.2 | 10.8 |
| Catalyst B31 (Comparative Example 4) | less than 0.1 | 57.3 | 4.4 | 3.6 | 49.3 |

It can be seen from the results of Table 3 that the catalyst decreased in activity by sulfur poisoning can be effectively activated by pretreatment using halogen or a halogen-containing compound, but that even if the oxychlorination treatment is applied after the decoking, the activity is not restored.

EXAMPLE 4

(1) 3 g of Catalyst B was placed in a reactor and subjected to pretreatment by under a flow of a mixed gas of (CFCl$_2$)$_2$/N$_2$=2/98 (by volume) at a rate of 50 cc/min at 270° C. for one hour. Thereafter, the mixed gas to be passed through the reactor was replaced by a mixed gas of (CFCl$_2$)$_2$/O$_2$/N$_2$=2.0/9.8/88.2, and the restoration treatment was carried out under the same conditions as in Example 2. The catalyst thus restored is hereinafter referred to as Catalyst B4. Catalyst B4 was evaluated in the same manner as in Example 1. The results are shown in Table 4.

In this experiment, without application of the pretreatment, Catalyst B was restored under the same conditions as in Example 2. The catalyst thus obtained is hereinafter referred to as Catalyst B5. Catalyst B5 was evaluated in the same manner as in Example 1. The results are shown in Table 4.

(2) 2.5 g of Catalyst B was placed in a reactor and subjected to pretreatment under a flow of a mixed gas of CCl$_4$/N$_2$=0.1/99.9 (by volume) at a rate of 200 cc/min at 400° C. for 30 minutes. Then the mixed gas to be passed through the reactor was replaced by a mixture of CCl$_4$/O$_2$/N$_2$=0.02/2/97.88, heated to and maintained at 500° C. for an hour. Thereafter, said gas was replaced by a mixture of (CFCl$_2$)$_2$/O$_2$/N$_2$=0.4/10/89.6, to be maintained at 500° C. for further 30 minutes. The catalyst thus restored (hereinafter referred to as Catalyst B71) was evaluated in the same manner as in Example 1. The results are shown in Table 4.

(3) 2.5 g of Catalyst B was placed in a reactor and subjected to pretreatment under a flow of a mixed gas of CCl$_4$/O$_2$/N$_2$=0.02/2/97.88 (by volume) at a rate of 200 cc/min at 400° C. for 30 minutes, and then heated to and maintained at 500° C. for an hour while passing the said mixed gas. Thereafter, said gas was replaced by a mixed gas of (CFCl$_2$)$_2$/O$_2$/N$_2$=0.4/10/89.6, and maintained at 500° C. for further 30 minutes. The catalyst thus restored (hereinafter referred to as Catalyst B72) was evaluated in the same manner as in Example 1. The results are shown in Table 4.

COMPARATIVE EXAMPLE 5

Catalyst B was subjected to decoking in the same manner as in Example 2 except that a mixed gas not containing flon gas ($O_2/N_2=10/90$ by volume) was used. The catalyst thus restored is hereinafter referred to as Catalyst B6. Catalyst B6 was evaluated in the same manner as in Example 1. The results are shown in Table 4.

TABLE 4

|  | Coke (%) | Conversion (wt %) | $C_1$-$C_4$ (wt %) | $C_5$ (wt %) | Benzene (wt %) |
|---|---|---|---|---|---|
| Catalyst A (Fresh Catalyst) | less than 0.1 | 94.7 | 7.0 | 5.5 | 82.2 |
| Catalyst B (Deactivated Catalyst) | 0.2 | 1.2 | 0.2 | 0.2 | 0.8 |
| Catalyst B4 (Example 4) | less than 0.1 | 92.3 | 4.9 | 4.4 | 83.0 |
| Catalyst B5 (Example 4) | less than 0.1 | 77.8 | 6.5 | 7.2 | 64.1 |
| Catalyst B6 (Comparative Example 5) | less than 0.1 | 7.7 | 1.1 | 0.8 | 5.8 |
| Catalyst B71 (Example 4) | less than 0.1 | 98.8 | 6.6 | 3.3 | 88.9 |
| Catalyst B72 (Example 4) | less than 0.1 | 96.5 | 6.7 | 4.3 | 85.5 |

EXAMPLE 5

3 g of Catalyst B was placed in a reactor and was subjected to pretreatment under a flow of a mixed gas of $(CFCl_2)_2/N_2=2/98$ (by volume) at a rate of 50 cc/min at 270° C. for one hour. Next, the mixed gas to be passed through the reactor was replaced by a mixed gas of $(CFCl_2)_2/O_2/N_2=2.0/9.8/88.2$, and Catalyst B was restored by maintaining at 270° C. for 30 minutes, and then heating to maintaining at 500° C. for 15 minutes. The catalyst thus restored is hereinafter referred to as Catalyst B7. Catalyst B7 was evaluated in the same manner as in Example 1. The results are shown in Table 5.

EXAMPLE 6

Catalyst B was restored in the same manner as in Example 5 except that the mixed gas to be used in the decorking was replaced by a mixed gas of $CFCl_3/O_2/N_2=2.0/9.8/88.2$. The catalyst thus obtained was hereinafter referred to as Catalyst B8. Catalyst B8 was evaluated in the same manner as in Example 1. The results are shown in Table 5.

COMPARATIVE EXAMPLE 6

Catalyst B was decoked in the same manner as in Example 5 except that the pretreatment was not applied and a mixed gas not containing flon gas ($O_2/N_2=10/90$ by volume) was used. The catalyst thus restored is hereinafter referred to as Catalyst B9. Catalyst B9 was evaluated in the same manner as in Example 1. The results are shown in Table 5.

TABLE 5

|  | Coke (%) | Conversion (wt %) | $C_1$-$C_4$ (wt %) | $C_5$ (wt %) | Benzene (wt %) |
|---|---|---|---|---|---|
| Catalyst A (Fresh Catalyst) | less than 0.1 | 94.7 | 7.0 | 5.5 | 82.2 |
| Catalyst B (Deactivated Catalyst) | 0.2 | 1.2 | 0.2 | 0.2 | 0.8 |
| Catalyst B7 (Example 5) | less than 0.1 | 98.8 | 6.7 | 5.1 | 87.0 |
| Catalyst B8 (Example 6) | less than 0.1 | 93.1 | 6.6 | 4.5 | 82.0 |
| Catalyst B9 (Comparative Example 6) | less than 0.1 | 4.8 | 1.4 | 0.7 | 2.7 |

EXAMPLE 7

(a) Deactivation of Catalyst

Using light naphtha having the composition n-hexane/methylcyclopentane=49/43/8 (by weight) as a feed, the aromatization reaction was carried out in the presence of Catalyst A under conditions of temperature 500° C., pressure 5 kg/cm$^2$G, weight hourly space velocity 2 hr$^{-1}$, and hydrogen/hydrocarbon ratio (by volume) 5/1 to deactivate Catalyst A to a lower conversion than that of the catalyst A1. The catalyst thus deactivated is hereinafter referred to as Catalyst C.

(b) Restoration of Deactivated Catalyst 3 g of Catalyst C was placed in a reactor and subjected to pretreatment under a flow of a mixed gas of $(CFCl_2)_2/N_2=2/98$ (by volume) at a rate of 50 cc/min at 270° C. for one hour. Then the mixed gas to be passed through the reactor was replaced by a mixed gas of $(CFCl_2)_2/O_2/N_2=2.0/9.8/88.2$, and the restoration was carried out by maintaining at 270° C. for 30 minutes and then heating to and maintaining at 500° C. for 15 minutes. The catalyst thus restored is hereinafter referred to as Catalyst C1. Catalyst C1 was evaluated in the same manner as in Example 1. The results are shown in Table 6.

EXAMPLE 8

Catalyst C was restored in the same manner as in Example 7 except that the pretreatment was not applied. The catalyst thus obtained is hereinafter referred to as Catalyst C2. Catalyst C2 was evaluated in the same manner as in Example 1. The results are shown in Table 6.

COMPARATIVE EXAMPLE 7

The catalyst was subjected to decoking in the same manner as in Example 7 except that the pretreatment was not applied and a mixed gas not containing flon gas ($O_2/N_2=10/90$ (by volume)) was used. The catalyst thus restored is hereinafter referred to as Catalyst C3. Catalyst C3 was evaluated in the same manner as in Example 1. The results are shown in Table 6.

TABLE 6

|  | Coke (%) | Conversion (wt %) | $C_1$-$C_4$ (wt %) | $C_5$ (wt %) | Benzene (wt %) |
|---|---|---|---|---|---|
| Catalyst A (Fresh Catalyst) | less than 0.1 | 94.7 | 7.0 | 5.5 | 82.2 |
| Catalyst C (Deactivated Catalyst) | 0.5 | 14.4 | 1.7 | 1.7 | 11.0 |
| Catalyst C1 (Example 7) | less than 0.1 | 94.5 | 5.0 | 4.5 | 85.0 |
| Catalyst C2 (Example 8) | less than 0.1 | 85.2 | 7.2 | 7.9 | 70.1 |
| Catalyst C3 | less than | 20.9 | 3.6 | 2.1 | 15.2 |

TABLE 6-continued

|  | Coke (%) | Conversion (wt %) | $C_1$-$C_4$ (wt %) | $C_5$ (wt %) | Benzene (wt %) |
|---|---|---|---|---|---|
| (Comparative Example 7) | 0.1 | | | | |

It can be seen from the results of Table 6 that (1) the activity of extremely deactivated catalyst cannot be restored by the conventional method (Comparative Example 7), and (2) if it is subjected to decoking in the presence of the halogen compound, the activity is markedly restored, and (3) if it is subjected to the pretreatment using the halogen compound and then to the decoking using the halogen compound, the activity is restored to a level nearly equal to that of the fresh catalyst.

EXAMPLE 9

(a) Preparation of Catalyst

Platinum was supported on KL-type zeolite (SiO$_2$/KL=20/100 by weight) molded using a silica binder according to the method described in Japanese patent application Laid-Open No. 57653/1987 (U.S. Pat. No. 4,681,865). The catalyst thus obtained is hereinafter referred to as Catalyst D.

(b) Deactivation of Catalyst

To the same light naphtha as used in Example 1 was added a sulfur material to prepare a feed having a sulfur content of 1 ppm. Using the feed as prepared above, the aromatization reaction was carried out in the presence of Catalyst D under the conditions of temperature of 500° C., pressure of 5 kg/cm$^2$G, weight hourly space velocity of 2 hr$^{-1}$, and hydrogen/hydrocarbon ratio (by volume) of 5/1 to deactivate Catalyst D. This deactivated catalyst is hereinafter referred to as Catalyst D1.

(c) Restoration of Deactivated Catalyst 2.5 g of Catalyst D1 was placed in a reactor and was subjected to pretreatment under a flow of a mixed gas of CCl$_4$/N$_2$=0.1/99.9 (by volume) at a rate of 200 cc/min at 400° C. for 30 minutes. Then the mixed gas to be passed through the reactor was replaced by a mixture of CCl$_4$/O$_2$/N$_2$=0.02/2/97.88 and heated to and maintained at 500° C. for an hour. Thereafter, the said gas was replaced by a mixture of (CFCl$_2$)$_2$/O$_2$/N$_2$=0.4/10/89.6, and maintained at 500° C. for further 30 minutes. The catalyst thus restored is hereinafter referred to as Catalyst D2. Catalyst D2 was evaluated in the same manner as in Example 1. The results are shown in Table 7.

COMPARATIVE EXAMPLE 8

2.5 g of Catalyst D1 was placed in a reactor and treated for 30 minutes at 400° C. while passing therethrough a nitrogen gas at a rate of 200 cc/min. Then the gas to be passed through the reactor was replaced by a mixture of O$_2$/N$_2$=2/98, and heated to and maintained at 500° C. for an hour. Furthermore, the said gas was replaced by a mixture of O$_2$/N$_2$=10/90, and maintained at 500° C. for 30 minutes. The catalyst thus restored is hereinafter referred to as Catalyst D3. Catalyst D3 was evaluated in the same manner as in Example 1. The results are shown in Table 7.

TABLE 7

|  | Coke (%) | Conversion (wt %) | $C_1$-$C_4$ (wt %) | $C_5$ (wt %) | Benzene (wt %) |
|---|---|---|---|---|---|
| Catalyst D (Fresh Catalyst) | less than 0.1 | 90.0 | 13.5 | 5.4 | 71.1 |
| Catalyst D1 (Deactivated Catalyst) | 0.3 | 30.2 | 5.9 | 2.5 | 21.8 |
| Catalyst D2 (Example 9) | less than 0.1 | 91.5 | 9.1 | 5.1 | 77.3 |
| Catalyst D3 (Comparative Example 8) | less than 0.1 | 23.0 | 5.0 | 1.9 | 16.1 |

EXAMPLE 10

(a) Preparation of Catalyst

KL-type zeolite molded using a silica binder (SiO$_2$/KL=20/100 by weight) was ion-exchanged in barium nitrate solution, and then platinum was supported thereon. The catalyst thus obtained is hereinafter referred to as Catalyst E.

(b) Deactivation of Catalyst

To the same light naphtha as used in Example 1 was added a sulfur material to prepare a feed having a sulfur content of 1 ppm. Using the feed as prepared above, the aromatization reaction was carried out in the presence of Catalyst E under the conditions of temperature of 500° C., pressure of 5 kg/cm$^2$G, weight hourly space velocity of 2 hr$^{-1}$, and hydrogen/hydrocarbon ratio (by volume) of 5/1 to deactivate Catalyst E. This deactivated catalyst is hereinafter referred to as Catalyst E1.

(c) Restoration of Deactivated Catalyst 2.5 g of the Catalyst E1 was placed in a reactor and was subjected to pretreatment under a flow of a mixed gas of CCl$_4$/N$_2$=0.1/99.9 (by volume) at a rate of 200 cc/min at 400° C. for 30 minutes. Then the mixed gas to be passed through the reactor was replaced by a mixture of CCl$_4$/O$_2$/N$_2$=0.02/2/97.88, heated to and maintained at 500° C. for an hour. Thereafter, the said gas of (CFCl$_2$)$_2$/O$_2$/N$_2$=0.4/10/89.6, and maintained at 500° C. for further 30 minutes. The catalyst thus restored is hereinafter referred to as Catalyst E2. Catalyst E2 was evaluated in the same manner as in Example 1. The results are shown in Table 8.

COMPARATIVE EXAMPLE 9

2.5 g of Catalyst E1 was placed in a reactor and nitrogen gas was passed through it at a rate of 200 cc/min at 400° C. for 30 minutes, and then the gas was replaced by a mixed gas of O$_2$/N$_2$=2/98, heated to and maintained at 500° C. for an hour. After that, the mixed gas to be passed through the reactor was replaced by a mixture of O$_2$/N$_2$=10/90, and maintained at 500° C. for 30 minutes. The catalyst thus obtained is hereinafter referred to as Catalyst E3. Catalyst E3 was evaluated in the same manner as in Example 1. The results are shown in Table 8.

TABLE 8

|  | Coke (%) | Conversion (wt %) | $C_1$-$C_4$ (wt %) | $C_5$ (wt %) | Benzene (wt %) |
|---|---|---|---|---|---|
| Catalyst E (Fresh Catalyst) | less than 0.1 | 89.4 | 12.9 | 7.1 | 69.4 |
| Catalyst E1 | 0.4 | 17.9 | 3.7 | 2.1 | 12.1 |

TABLE 8-continued

| | Coke (%) | Conversion (wt %) | $C_1$–$C_4$ (wt %) | $C_5$ (wt %) | Benzene (wt %) |
|---|---|---|---|---|---|
| (Deactivated Catalyst) | | | | | |
| Catalyst E2 (Example 10) | less than 0.1 | 90.1 | 9.0 | 6.3 | 74.8 |
| Catalyst E3 (Comparative Example 9) | less than 0.1 | 13.7 | 3.2 | 1.6 | 8.9 |

What is claimed is:

1. In a process for restoring deactivated catalysts, said catalysts containing zeolite with a noble metal of Group VIII of the Periodic Table supported thereon for use in production of aromatic compounds, the improvement which comprises decoking deactivated catalysts at a temperature of 200° C. to 525° C. in the presence of a gas mixture of a pressure of 0 to 20 kg/cm$^2$G and which comprises oxygen and 0.01 to 10% of a fluorocarbon compound selected from the group consisting of $CF_4$, $CF_3Cl$, $CF_2Cl_2$, $CFCl_3$, $CHFCl_2$, $CHF_2Cl$, $CHF_3$, $C_2F_2Cl_4$, $C_2F_4Cl_2$ and $C_2H_4F_2$.

2. The process as claimed in claim 1, wherein the fluorocarbon compound is $CFCl_3$ or $C_2F_2Cl_4$.

3. The process as claimed in claim 1, wherein the zeolite is selected from X, Y, L, Mordenite or ZSM-5 zeolite.

4. The process as claimed in claim 1, wherein the noble metal of Group VIII of the Periodic Table is Os, Ru, Rh, Ir, Pd or Pt.

5. The process as claimed in claim 3, wherein the noble metal of Group VIII of the Periodic Table is Os, Ru, Rh, Ir, Pd or Pt.

6. The process of claim 1 wherein the fluorocarbon is used as a mixed gas with air or a mixture of nitrogen and oxygen.

7. The process of claim 5, wherein the fluorocarbon is used as a mixed gas with air or a mixture of nitrogen and oxygen.

8. In a process for restoring a deactivated catalyst containing zeolite with a noble metal of Group VIII of the Periodic Table supported thereon and used in the production of aromatic compounds, the improvement which comprises treating the deactivated catalyst at a temperature of 100° to 500° C. and a pressure of 0 to 20 kg/cm$^2$G, with a gas mixture consisting essentially of inert gas and at least 0.01% of a halogen selected from the group consisting of $F_2$, $Cl_2$ and $Br_2$ or a halogen-containing compound selected from the group consisting of $CF_4$, $CF_3Cl$, $CF_2Cl_2$, $CFCl_3$, $CHFCl_2$, $CHF_2Cl$, $CHF_3$, $C_2F_2Cl_4$, $C_2F_4Cl_2$ and $C_2H_4F_2$; and, thereafter decoking the deactivated catalyst in the presence of a gas mixture comprising oxygen and 0.01 to 10% of a fluorocarbon compound selected from the group consisting of $CF_4$, $CF_3Cl$, $CF_2Cl_2$, $CFCl_3$, $CHFCl_2$, $CHF_2Cl$, $CHF_3$, $C_2F_2Cl_4$, $C_2F_4Cl_2$ and $C_2H_4F_2$.

9. The process as claimed in claim 8, wherein the treating of the deactivated catalyst is with the halogen.

10. The process as claimed in claim 8, wherein the treating of the deactivated catalysts is with the halogen-containing compound.

11. The process of claim 8 wherein the fluorocarbon compound in each step is $C_2F_2Cl_4$.

12. The process of claim 8 wherein the fluorocarbon compound in each step is $CF_2Cl_2$.

13. The process as claimed in claim 8, wherein the zeolite is selected from X, Y, L, Mordenite or ZSM-5 zeolite.

14. The process as claimed in claim 13, wherein the noble metal of Group VIII of the Periodic Table is Os, Ru, Rh, Ir, Pd or Pt.

* * * * *

UNITED STATES PATENT AND TRADEMARK OFFICE
CERTIFICATE OF CORRECTION

PATENT NO. : 4,937,215
DATED : June 26, 1990
INVENTOR(S) : MURAKAWA et al

It is certified that error appears in the above-identified patent and that said Letters Patent is hereby corrected as shown below:

In the title page, insert the following cited references:

U.S. PATENT DOCUMENTS:

3,418,256   12/1968   Rigney et al
4,645,751   2/1987    McCullen et al
3,318,802   5/1967    Martin

FOREIGN PATENT DOCUMENTS:

1,489,105        1967    France

OTHER DOCUMENTS:

Patent Abstracts of Japan, Vol.7, No.285 (C-201) 1430, 20th December 1983; & JP-A-58 164 527 (Teijin Yuka K.K.) 29-09-1983.

Signed and Sealed this

Seventeenth Day of March, 1992

*Attest:*

HARRY F. MANBECK, JR.

*Attesting Officer*   *Commissioner of Patents and Trademarks*